United States Patent [19]

Hara et al.

[11] Patent Number: 5,637,405

[45] Date of Patent: Jun. 10, 1997

[54] MAGNETIC RECORDING MEDIUM HAVING A BACKCOAT LAYER CONTAINING CARBON BLACK, AN ORGANIC COLORANT RESIDUE AND A SILICONE COMPOUND

[75] Inventors: Yoshio Hara; Michio Yabuno; Masami Kuwahara, all of Tokyo, Japan

[73] Assignee: Toyo Ink Manufacturing Co. Ltd., Tokyo, Japan

[21] Appl. No.: 346,738

[22] Filed: Nov. 30, 1994

[30] Foreign Application Priority Data

Dec. 3, 1993 [JP] Japan .................................. 5-303981

[51] Int. Cl.$^6$ .................................. G11B 5/702
[52] U.S. Cl. .................................. 428/447; 428/694 BB; 428/900
[58] Field of Search .................................. 428/447, 694 BB, 428/900

[56] References Cited

U.S. PATENT DOCUMENTS

| | | | |
|---|---|---|---|
| 4,328,935 | 5/1982 | Steel | 242/192 |
| 4,775,595 | 10/1988 | Hasegawa | 428/525.9 |
| 4,812,518 | 3/1989 | Haubennestel et al. | 525/100 |
| 5,179,142 | 1/1993 | Ono et al. | 524/35 |
| 5,262,492 | 11/1993 | Hanada et al. | 525/415 |

FOREIGN PATENT DOCUMENTS

| | | |
|---|---|---|
| 0473812A1 | 3/1992 | European Pat. Off. . |
| 2710268 | 9/1977 | Germany . |
| 61-273720 | 5/1985 | Japan . |
| 62-187772 | 8/1987 | Japan . |

Primary Examiner—Stevan A. Resan
Attorney, Agent, or Firm—Knobbe, Martens, Olson & Bear, LLP

[57] ABSTRACT

A magnetic recording medium comprising a magnetic layer, a backing layer, and a support sandwiched between the magnetic layer and the backing layer. The backing layer is made form a coating composition comprising a filler, binder, and a silicone compound represented by the following formula (I):

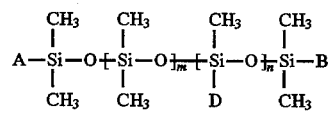

wherein groups A, B, and D each independently represent —$CH_3$ or a group —X—Y—Z, in which X represents a C1–C11 alkylene or —$(CH_2)_3NHCO$—, Y represents a specific aliphatic group, alicyclic group, or an aromatic group, and Z represents —OH, m is an integer from 4 to about 150, and n is an integer from 1 to 6, the compound of formula (I) containing at least one —X—Y—Z group, with the ratio of the number of groups —X—Y—Z to m being from 1:3 to 1: about 30.

18 Claims, No Drawings

MAGNETIC RECORDING MEDIUM HAVING A BACKCOAT LAYER CONTAINING CARBON BLACK, AN ORGANIC COLORANT RESIDUE AND A SILICONE COMPOUND

BACKGROUND OF THE INVENTION

1) Field of the Invention

The present invention relates to a magnetic recording medium, and more particularly, to a magnetic recording medium including a backing layer which has a very smooth and flat surface and which does not adhere to a magnetic layer when the medium is stored over a long period.

2) Related Art

Recently, as recording density of magnetic recording media is enhanced, the surfaces of their magnetic layers have become more mirror-like, thereby making stable traveling of magnetic tapes difficult. In practice, therefore, a backing layer is provided on the opposite surface of a support with respect to a magnetic layer to ensure stable traveling performance of a magnetic recording medium. In order to prevent a surface-form of the backing layer from being transcribed to the magnetic layer, there is acute need for smoothness of the backing layer itself. However, if the magnetic layer and the backing layer both have smooth and flat surfaces, the two layers adhere to each other after the magnetic recording medium is stored in a wound state for a long time. This phenomenon causes damages to the magnetic layer, so as to lead to increase in dropout and occurrence of jittering of images.

In addition, as portable video cameras have been popular, they have come to be used under a variety of situations such as an outdoor field, etc. As a result, it is necessary to prevent adhesion when the cameras are exposed to severe environments such as high temperature and high humidity over long periods.

To prevent adhesion, addition of a silicone oil is known. However, since the silicone oil generally has poor compatibility with binders, it is liable to cause defects in coating films such as repelling, pin holes, and the like. Proposed is an attempt for improving compatibility between silicone oils and binders by denaturing the silicone oils using fatty acids (JP-A-61-273720). This is effective as long as the compatibility is concerned. However, since the silicone oil and the binder are not fixed to each other, the silicone oil transfers to the magnetic layer when stored in a wound state for a long period. Thus, preventing adhesion does not last long. Furthermore, the silicone oil transferred to the magnetic layer often affects electromagnetic characteristics of the magnetic layer. Another proposal is to use a reaction product of a reactive polysiloxane and a reactive resin. This approach is not successful in achieving sufficient non-adhesion property, because the polysiloxane is taken into the resin so as to hinder molecular orientation of the polysiloxane onto the surface of the backing layer.

The inventors of the present invention have conducted extensive studies to solve the above problems, and they have invented the magnetic recording medium as described below.

An objection of the invention to provide a magnetic recording medium which has a smooth and flat surface.

Another object of the invention is to provide a recording medium which hardly has pinholes nor occurs repelling.

The other object of the invention is to provide a magnetic recording medium having sufficient durability of its backing layer.

A further object of the invention is to provide a paint for producing a backing layer of the above medium.

SUMMARY OF THE INVENTION

In the first aspect, the present invention is a magnetic recording medium comprising a magnetic layer, a backing layer, and a support sandwiched between the magnetic layer and the backing layer, wherein the backing layer is made from a coating composition comprising a filler, binder, and a silicone compound represented by the following formula (I):

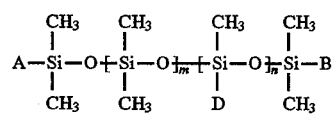

wherein groups A, B, and D each independently represent —$CH_3$ or a group —X—Y—Z, in which X represents a C1–C11 alkylene or —$(CH_2)_3NHCO$—, Y represents an aliphatic group, alicyclic group, or an aromatic group having at least 3 carboxylate ester bonds therein and a number-average molecular weight Mn of from about 300 to about 3,000, and Z represents —OH, m is an integer from 4 to about 150, and n is an integer from 1 to 6, the compound of formula (I) containing at least one —X—Y—Z group, with the ratio of the number of groups —X—Y—Z to m being from 1:3 to 1: about 30.

In the second aspect, the invention is a paint for forming a backing layer which is provided on/over one surface of a magnetic recording medium wherein on/over the other surface thereof a magnetic layer is provided, comprising a filler, a binder, a dispersant and the silicone compound of formula (I).

DESCRIPTION OF PREFERRED EMBODIMENTS

The fillers which can be used in the present invention are those which are generally used in backing layers, and include carbon black, graphite, calcium carbonate, barium sulfate, titanium oxide, alpha-iron oxide, plate-like alpha-iron oxide, alumina, zirconia, silicon carbide, silicon oxide, chromium oxide, magnesium carbonate, zinc oxide, silica, etc. From the viewpoints of conductivity and light shielding, carbon black is preferable. Specific examples of carbon black include BLACKPEARLS 1400, 1300, 1100, 800, MONARCH 1400, 1300, 1100, 800, 120, VULCAN-XC 72, BLACKPEARLS L (ex Cabot); #3750, #3950, #2600, #2400, #990, #960, #850, MA 600, MA 7, MA 100, MA 100R (ex Mitsubishi Kasei Corp.); CONDUCTEX-SC, CONDUCTEX 975, RABEN 7000, 5000, 3500, 2000, 1500, 1255, 1250, 1170, 1080, 1020, 760, 450, SEVACARB MT (ex Corenbian Carbon); #80, #55, #50, #35, #15, ASAHI-MARSAL (ex Asahi Carbon); Shiest 9H, 7H, 5H (ex Tokai Carbon Co., Ltd); Ketchen Black EC600JD (ex Akzo); and Thermax MT-N990 (ex Cancarv).

An average first particle size of the carbon black, which is limited to specific one, is preferably 10–40 nm for surface smoothness and flatness. Adjustment of a surface coarse level, traveling property and durability are improved by mixing carbon blacks having an average first particle size of 10–40 nm and 40–500 nm, respectively, in a ratio of the former to the latter of from 99.5:0.5 to 30:70. Durability can also be improved by using both carbon black and an inorganic pigment such as titanium oxide, calcium carbonate, alpha iron oxide, barium sulfate.

The binders which can be used in the present invention are known thermoplastic resins, thermosetting resins, reactive resins, cellulose resins, and mixtures thereof. The thermoplastic resins are those having a glass transition temperature of from −100 to 150° C. and a number-average molecular weight of from 1,000 to 200,000, preferably from 10,000 to 100,000. Examples thereof include polymers and copolymers containing, as their monomer units, vinyl chloride, vinyl acetate, vinyl alcohol, maleic acid, acrylic acid, acrylic esters, vinylidene chloride, acrylonitrile, styrene, vinyl butyral, or vinyl acetal; polyurethane resins; polyester resins; and various resins of a rubber type. Examples of the thermosetting resins include phenol resins, epoxy resins, phenoxy resins, polyurethane setting resins, urea resins, melamine resins, alkyd resins, acrylic resins, formaldehyde resins, silicone resins, mixtures of a polyester resin and an isocyanate prepolymer, mixtures of polyester polyol and polyisocyanate, and mixtures of polyurethane and polyisocyanate. Examples of fiber resins include nitrocellulose, ethylcellulose, cellulose acetate butyrate, and cellulose acetate propionate.

The above resins are used alone or in combination. Preferred are combinations of a polyurethane resin and a member selected from the group consisting of vinyl chloride resins, vinyl chloride/vinyl acetate resins, vinyl chloride/vinyl acetate/vinyl alcohol resins, vinyl chloride/vinyl acetate/maleic anhydride resins, vinyl chloride/acrylic ester resins, nitrocellulose, and phenoxy resins; and combinations further including polyisocyanate. It is more preferable to use a combination of nitrocellulose, a urethane resin and polyisocyanate; and a combination of a vinyl chloride resin, a urethane resin and a polyisocyanate.

Preferable examples of the vinyl chloride copolymers include those containing a repeating unit of vinyl chloride, a repeating unit having an epoxy group, and a repeating unit containing a polar group such as —SO$_3$M, —OSO$_3$M, COOM, —PO(OM)$_2$ (M is hydrogen or an alkali metal).

The urethane resins which can be used in the invention are known ones such as polyester polyurethane, polyether polyurethane, polycarbonate polyurethane, and polycaprolactone polyurethane. They may optionally have at least one polar group selected from the group consisting of —COOM, —SO$_3$M, —OSO$_3$M, —PO(OM)$_2$ (M is hydrogen or alkali metal), —OH, NR$_2$, N$^+$R$_3$(R is hydrocarbon), epoxy, and sulfobetaine.

Specific examples of the polyisocyanate include tolylene diisocyanate, 4,4'-diphenylmethane diisocyanate, hexamethylene diisocyanate, xylylene diisocyanate, orthotoluidine isocyanate, isophorone diisocyanate, and triphenylmethane triisocyanate; reaction products of such an isocyanate as above and a polyalcohol; and polyisocyanates obtained from condensation reaction of isocyanates.

The polyisocyantes react with the polar groups in a binder and achieve three-dimensional cross-linking, thereby enhancing the strength and durability of the coating. In addition, they react with —OH in the silicone compound of the present invention, and thus they immobilize the silicone compound onto the surface of the coating.

In the group —X—Y—Z of the silicone compound which can be used in the invention, Y is an important part of the silicone compound. The group Y is a carboxylate ester group having at least 3 groups represented by the following formula

If the number of carboxylate ester groups contained in group Y is 1 or 2, sufficient compatibility with various binders cannot be obtained. These groups are linked to each other by a divalent hydrocarbon group having 2 to 12, and preferably 4 to 6 carbon atoms. Saturated aliphatic hydrocarbon having 5 carbon atoms is especially preferred. Group Y is preferably a polycaprolactone formed by polymerization of caprolactone, as described below. Group Y preferably has a number-average molecular weight of 300 to 3,000, and more preferably 500 to 1,500.

In the group —X—Y—Z of the silicone compound used in the present invention, X is preferably a C1–C11 alkylene or —(CH$_2$)$_3$NHCO— and Z is preferably —OH. Z may be —COOH, —NCO, or —CH=CH$_2$; and —OH is the most preferred for Z in view of the stability of the resultant compound, compatibility with the binder, and reactivity. The hydroxyl value of the silicone compound containing —OH is preferably not less than 5 (KOHmg/g). If the hydroxyl value is less than 5 (KOHmg/g), reaction with the binder proceeds insufficiently so as to allow the silicone compound to transfer into a magnetic layer. As a result, adhesion prevention effect does not last for a long time.

In the silicone compound used in the present invention, each of groups A and B is preferably a group —X—Y—Z, and group D is preferably —CH$_3$. This is a so-called linear siloxane. Another preferable example is one in which each of groups A and B is —CH$_3$ and group D is a group —X—Y—Z. The ratio of the number of groups —X—Y—Z to m is preferably from 1:3 to 1: about 30, and more preferably from 1:4 to 1:16. Ratios greater than 1: about 30 considerably result in reduction of the compatibility with the binder.

In the silicone compound used in the present invention, m is preferably an integer from 4 to about 150, and n is preferably an integer from 1 to 6.

The silicone compound used in the invention can be prepared from a reactive polysiloxane containing —OH, —COOH, and —NH$_2$. The equivalent amount of a starting polysiloxane compound required for the reaction for obtaining an ester group-containing olysiloxane is decided on the basis of determination of a hydroxyl value, acid value, or an amine value. The reaction between a lactone such as beta-propiolactone, delta-valerolactone, epsilon-caprolactone, or dodecalactone and a reactive siloxane containing —OH is carried out by a ring-opening esterification method. The —OH group required for initiating ring-opening polymerization is supplied from the reactive siloxane containing —OH. The chain length of the polyester is changed as a function of mol numbers of the lactone consumed by the hydroxyl group. The lactone polymerization proceeds, for example, as described in the following scheme (II), in a suitable solvent such as a high boiling point fraction of gasoline distillate, an alkyl benzene, an ester or a ketone, or in its own molten state, at about 100° to about 180° C., in the presence of paratoluenesulfonic acid or dibutyric tindilaurate.

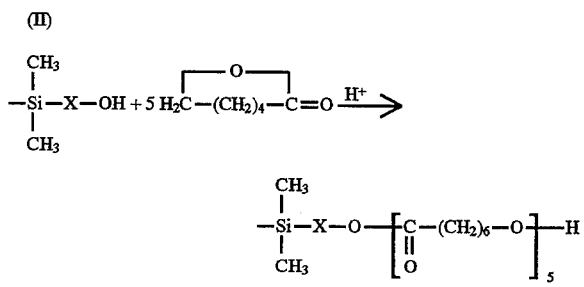

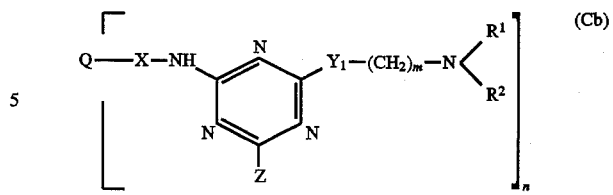

wherein Q is an organic colorant residue; X is a direct bond, CONH—$Y_2$—, —$SO_2NH$—$Y_2$, or $CH_2NHCOCH_2NH$—$Y_2$— in which $Y_2$ is an alkylene or arylene group;

$Y_1$ is —NH or —O—,

Z is hydroxy, alkoxy or

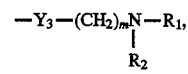

(in which $Y_3$ is NH or O), or —NH—X—Q when n is one;

$R_1$ and $R_2$ are each independently substituted or unsubstituted alkyl, or $R_1$ and $R_2$ may be linked to form at least one hereto ring:

m is an integer of 1–6: and n is an integer of 1–4.

The organic colorant residue includes a pigment or colorant such as phthalocyanine, azo, anthraquinone, quinaquidone, dioxazine, anthrapyrimidine, anthanthron, indanthron, flavanthron, perylene, perynone, thioindigo, isoindolinone, triphenylmethane, and benzimidazolone types. These compounds are particularly effective for obtaining a smooth and flat surface in case that carbonblack is used as the filler. The colorant may be used alone, as a dispersant, or in combination with a dispersant such as a coupling agent, or surfactant. The coating composition may optionally contain known lubricants, setting catalysts and anti-mold agents. The polyisocyanates are preferably added to and mixed with the coating composition immediately before applying the coating composition onto a magnetic recording medium.

In the invention, the amount of the organic colorant is preferably from 0.1 to 50 parts, more preferably from 0.5 to 30 parts by weight per 100 parts by weight of the filler. The ratio of the filler to the binder is from 100:5 to 100:300, more preferably from 100 : 10 to 100 : 200 on the basis of solid weight thereof.

Preparation Examples of the silicone compound used in the present invention are described hereinbelow.

The silicone compound used in the present invention is fixed or oriented onto the surface of the coating, when the silicone coating is dried. Therefore, a remarkable advantage can he effected by use of a small amount of the silicone compound. In the composition of the backing layer, the amount of the silicone compound of the invention is from 0.05 to 10.0% and preferably from 0.1 to 5.04%, based on the non-volatile components of the composition. If the amount of the silicone compound is less than 0.05%, prevention of adhesion is insufficient, whereas if the amount exceeds 10.0%, smoothness and flatness of the coating are reduced.

The coating according to the present invention can be manufactured by conventional methods. For example, a solution is obtained by dissolving a portion or the entire amount of the binder in an organic solvent such as methyl ethyl ketone, toluene, methylisobutylketone, butyl acetate, cyclohexanone, tetrahydrofuran. The filler is then added to the solution. The resultant mixture is stirred using any of various kinds of dispersing apparatus such as a double roll mill, a triple roll mill, a sand mill, an atriter, a kneader, or a dissolver to prepare dispersion. The silicone compound used in the invention can be added either during or after the dispersing operation. During dispersion, an organic colorant represented by the following formula (Ca) or (Cb) is preferably used as a dispersant.

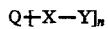

wherein Q is an organic colorant residue; X is a direct bond, CONH—$Y_1$—, —$SO_2NH$—$Y_1$, or $CH_2NHCOCH_2NH$—$Y_1$— in which $Y_2$ is an alkylene or arylene group which may have a substituent;

Y is a substituent represented by the following formula:

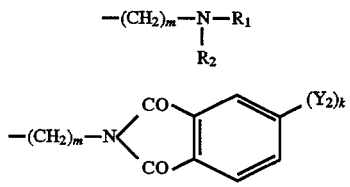

$R_1$ and $R_2$ are each independently substituted or unsubstituted alkyl, or $R_1$ and $R_2$ may be linked to form at least one hetero ring;

$Y_2$ is hydrogen, a halogen atom, $NO_2$, $NH_2$ or $SO_3H$;

K is an integer of 1–4; m is an integer of 1–6; and n is an integer of 1–4.

Preparation Example 1

Into a reactor equipped with a stirrer and a reflux condenser, added were polysiloxane (0.5 mol) of the following average formula having a hydroxyl value of 99 (KOHmg/g):

and dibutyl tinlaurate (100 ppm) so as to react them with epsilon-caprolactone (5 mol) in nitrogen atmosphere at 160° C. After the reaction for 8 hours, a silicone compound A having the following average formula was obtained.

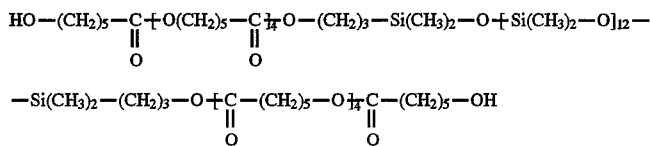

The silicone compound A had a hydroxyl value of 45 (KOHmg/g) and a saponification value of 240 (KOHmg/g).

Preparation Example 2

In the same manner as described in Preparation Example 1, polysiloxane (0.5 mol) of the following average formula having a hydroxyl value of 143 (KOHmg/g):

was reacted with epsilon-caprolactone (4 mol) to obtain a silicone compound B having the following average formula.

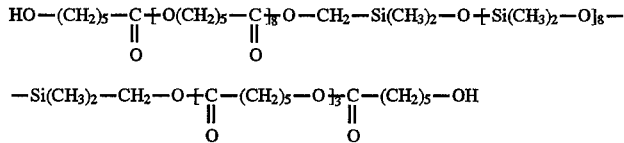

The silicone compound B had a hydroxyl value of 60 (KOHmg/g) and a saponification value of 256 (KOHmg/g).

Preparation Example 3

In the same manner as described in Preparation Example 1, polysiloxane (0.3 mol) of the following average formula having a hydroxyl value of 55 (KOHmg/g):

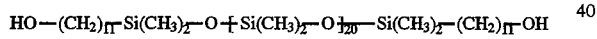

was reacted with epsilon-caprolactone (9 mol) to obtain a silicone compound C having the following average formula.

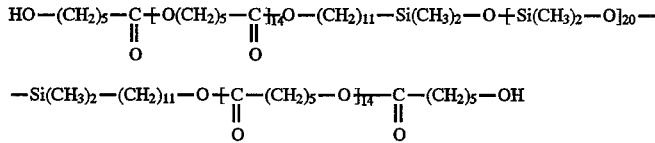

Silicone compound C had a hydroxyl value of 15 (KOHmg/g) and a saponification value of 340 (KOHmg/g).

Preparation Example 4

In the same manner as described in Preparation Example 1, polysiloxane (0.3 mol) of the following average formula having a hydroxyl value of 50 (KOHmg/g):

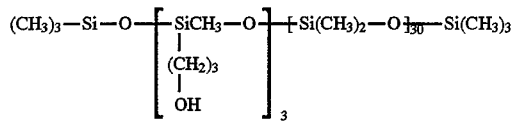

was reacted with epsilon-caprolactone (8 mol) to obtain a silicone compound D having the following average formula.

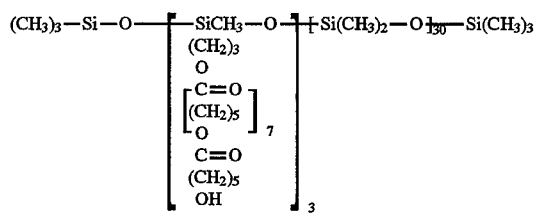

The silicone compound D had a hydroxyl value of 35 (KOHmg/g) and a saponification value of 240 (KOHmg/g).

Preparation Example 5

In the same manner as described in Preparation Example 1, polysiloxane (0.3 mol) of the following average formula having a hydroxyl value of 60 (KOHmg/g):

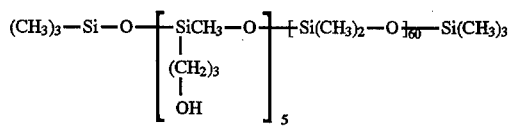

was reacted with epsilon-caprolactone (10 mol) to obtain a silicone compound E having the following average formula,

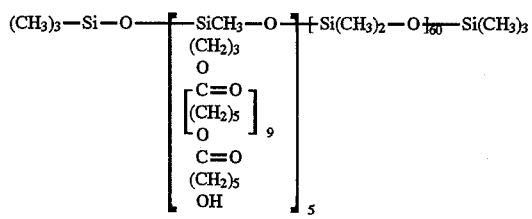

The silicone compound E had a hydroxyl value of 25 (KOHmg/g) and a saponification value of 280 (KOHmg/g).

Preparation Example 6

In the same manner as described in Preparation Example 1, polysiloxane (0.3 mol) of the following average formula having a hydroxyl value of 15 (KOHmg/g):

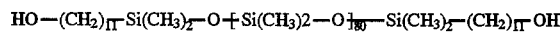

was reacted with epsilon-caprolactone (9 mol) to obtain a silicone compound F having the following average formula.

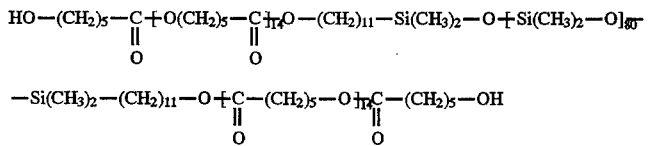

The silicone compound F had a hydroxyl value of 4 (KOHmg/g) and a saponification value of 200 (KOHmg/g).

Preparation Example 7

In the same manner as described in Preparation Example 1, polysiloxane (0.5 mol) of the following average formula having a hydroxyl value of 70 (KOHmg/g):

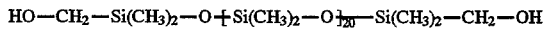

was reacted with epsilon-caprolactone (1 mol) to obtain a silicone compound G having the following average formula.

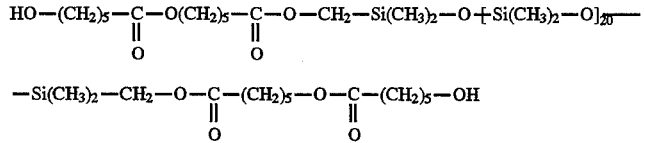

The silicone compound G had a hydroxyl value of 20 (KOHmg/g) and a saponification value of 100 (KOHmg/g).

EXAMPLES

The present invention will next be described by way of examples. In the Examples, the terms "parts" and "%" indicate "parts by weight" and "% by weight", respectively. The amounts of resins refer to those of solid resins.

Example 1

| | |
|---|---|
| Metallic iron magnetic powder (specific surface area: 50 m²/g, coercive force; 1500 Oe) | 100 parts |
| Vinyl chloride resin (MR-110, ex Nippon Zeon) | 10 parts |
| Urethane resin (Takerakku E-760, ex Takeda Chemical Industries, Ltd) | 5 parts |
| Alpha-alumina (particle size: 0.5μ) | 3 parts |
| Carbon black (Conductex SC, ex Columbia Carbon) | 5 parts |
| Stearic acid | 1 part |
| Butyl stearate | 1 part |
| Methyl ethyl ketone | 120 parts |
| Toluene | 120 parts |
| Cyclohexanone | 60 parts |

The above components were dispersed with a sand mill to prepare a magnetic coating composition. Three parts of a polyisocyanate compound (Coronate L, Nippon Polyurethane) were added to the composition. The resulting mixture was applied onto a support made from polyethylene terephthalate having a thickness of 10 μm. Molecular orientation was conducted, followed by drying. Subsequently, mirror-processing was performed by a calender process to obtain a magnetic coat having a thickness of 3 μm.

Separately, a back-coating composition of the following formulation was pretreated and dispersed by using a sand mill. To the resulting dispersion, 20 parts of Coronate L were further added to obtain carbon black dispersion. This dispersion was applied to the opposite surface of the support with respect to the magnetic layer, dried to form a backing layer having a thickness of 0.7 μm, and subjected to a setting process at 60° C. for 20 hours. It was cut. Thus, a magnetic tape having a width of a half inch was obtained.

| | |
|---|---|
| Carbon black (Blackpearls 800, ex Cabot) | 100 parts |
| Silicone compound A (prepared in Preparation Example 1) | 3 parts |
| Nitrocellulose (Celluline FM-200S, ex Dicel Chemical Industries, Ltd) | 60 parts |
| Urethane resin (Takeluck E-760, ex Takeda Pharmaceutical Chemical Industries, Ltd | 40 parts |
| Organic colorant CuPc—SO$_2$NH(CH$_2$)$_3$N(CH$_2$—CH$_3$)$_2$ (CuPc: phthalocyanine) | 5 parts |
| Methyl ethyl ketone | 400 parts |
| Toluene | 400 parts |
| Cyclohexanone | 200 parts |

Example 2

A magnetic tape was produced in the same manner as in Example 1, except that silicone compound A in the back-coating composition of Example 1 was replaced by silicone compound B.

Example 3

A magnetic tape was produced in the same manner as in Example 1, except that silicone compound A in the back-coating composition of Example 1 was replaced by silicone compound C prepared in Preparation Example 3.

Example 4

A magnetic tape was produced in the same manner as in Example 1 except that silicone compound A in the back-coating composition of Example 1 was replaced by silicone compound D prepared in Preparation Example 4.

Example 5

A magnetic tape was produced in the same manner as in Example 1 except that silicone compound A in the back-coating composition of Example 1 was replaced by silicone compound E prepared in Preparation Example 5.

Example 6

A magnetic tape was produced in the same manner as in Example 1 except that the nitrocellulose in the back-coating composition of Example 1 was replaced by a vinyl chloride resin (MR-110, Nippon Zeon).

Example 7

A magnetic tape was produced in the same manner as in Example 1 except that the organic colorant in the back-coating composition of Example 1 was eliminated.

Comparative Example 1

A magnetic tape was produced in the same manner as in Example 1 except that silicone compound A in the back-coating composition of Example 1 was eliminated.

Comparative Example 2

A magnetic tape was produced in the same manner as in Example 1 expect that silicone compound A in the back-coating composition of Example 1 was replaced by a reactive polysiloxane having the following average formula.

Comparative Example 3

A magnetic tape was produced in the same manner as in Example 1 except that silicone compound A in the back-coating composition of Example 1 was replaced by a reactive polysiloxane having the following average formula.

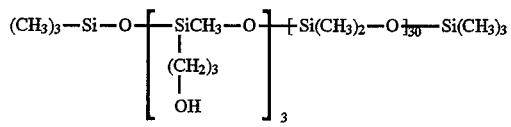

Comparative Example 4

A magnetic tape was produced in the same manner as in Example 1 except that silicone compound A in the back-coating composition of Example 1 was replaced by a polysiloxane modified with a fatty acid and having the following average formula.

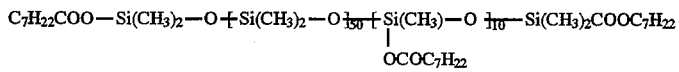

Comparative Example 5

A magnetic tape was produced in the same manner as in Example 1 except that silicone compound A in the back-coating composition of Example 1 was replaced by silicone compound F prepared in Preparation Example 6.

Comparative Example 6

A magnetic tape was produced in the same manner as in Example 1 except that silicone compound A in the back-coating composition of Example 1 was replaced by silicone compound G prepared in Preparation Example 7.

The magnetic tapes prepared in Examples 1 to 7 and Comparative Examples 1 to 6 were evaluated with respect to the roughness for a center line of the surface (Ra) of the backing layer, conditions of the surface of the coat, adhesion property of the coating onto the magnetic layer, transfer property of the silicone compounds into the magnetic layer, durability under traveling, and dropout.

The roughness for a center line of the surface (Ra) of the backing layer was measured using a roughness measuring apparatus equipped with a stylus, with a cut-off value of 0.08 mm, according to JIS-B-0601-1982.

The condition of the surface of the coating was visually checked in terms of pin holes; repelling in the surface; and uniformity of the surface, according to the following criteria:

A: Neither pin holes nor repelling was observed
B: Some pin holes and repelling were observed.
C: Many pin holes and much repelling were observed.

After winding the magnetic tape at a constant tension on a reel and allowing it to stand in high temperature/high humidity conditions (60° C., RH 80%) for 24 hours, adhesion of the coating to the magnetic layer was measured as an angle of the tape formed when it is rewound, according to JIS C6240. In addition, damage to the surface of the backing layer which had been separated was observed under a microscope and the following ratings were given.

A: No damage was found in the backing layer.

B: Separation was observed in a part of the backing layer.

C: 50% or more of the backing layer was separated.

With respect to the transfer property of the silicone compound to the magnetic layer, changes in critical surface tensions of the surfaces of the backing layer and the magnetic layer were investigated by measuring a contact angle before and after the adhesion test. Silicone compounds have a low critical surface tension. Therefore, if they transfer to the magnetic layer after the adhesion test, critical surface tension of the backing layer increases, whereas that of the magnetic layer decreases.

In the test for durability under traveling, damage to the surface of the backing layer of the tape was checked after 200 tape passes in a tape traveling tester. Dropout was measured using a dropout counter.

The results of the above tests are shown in Table 1. As is apparent from Table 1, the backing layer made from a coating composition containing the silicone compound used in the present invention does not adhere to the magnetic layer under severe conditions of high temperature and high humidity. Moreover, the silicone compound does not transfer to the magnetic layer after the adhesion test, and does not affect the magnetic layer. The silicone compound has excellent compatibility with other components in the coating composition. Thus, film-defects such as pin holes, repelling, or crawling are not observed in the surface of the backing layer. In addition, due to the lubricating effect of the silicone compound, durability in traveling is improved.

What is claimed is:

1. A magnetic recording medium comprising a magnetic layer, a backing layer, and a support sandwiched between the magnetic layer and the backing layer, wherein the backing layer is made from a coating composition comprising:

a filler containing carbon black;

an organic colorant of formula (Ca) or (Cb):

$$Q + X - Y]_n \quad \text{(Ca)}$$

wherein Q is an organic colorant residue selected from the group consisting of phthalocyanine, azo, anthraquinone, quinaquidone, dioxazine, anthrapyrimidine, anthanthron, indanthron, flavanthron, perylene, perynone, thioindigo, isoindolinone, triphenylmethane, and benzimidazolone; X is a direct bond, $CONH-Y^1-$, $-SO_2NH-Y^1$, or $CH_2NHCOCH_2NH-Y^1-$ wherein $Y^1$ is a substituted or unsubstituted alkylene or arylene group; Y is

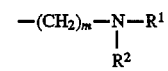

or

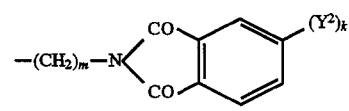

wherein $R^1$ and $R^2$ are each independently substituted or unsubstituted alkyl, or jointly form a substituted or unsubstituted nitrogen heterocycle; $Y^2$ is a hydrogen atom, a halogen atom, $NO_2$, $NH_2$, or $SO_3H$; k is an integer of 1–4; m is an integer of 1–6; and n is an integer of 1–4;

TABLE 1

| Examples/ Comparative Examples | Backing layer Ra (nm) | Surface conditions of the backing layer | Nonadhesiveness Angle of separation | Nonadhesiveness Damages of the backing layer | Changes in critical surface tension (dyn/cm) Backing layer | Changes in critical surface tension (dyn/cm) Magnetic layer | Durability under traveling | Dropout |
|---|---|---|---|---|---|---|---|---|
| Example: | | | | | | | | |
| 1 | 8.5 | A | 0° | A | +0.3 | −0.4 | B–A | A |
| 2 | 8.7 | A | 0° | A | +0.2 | −0.1 | A | A |
| 3 | 8.8 | A | 0° | A | +0.1 | −0.2 | A | A |
| 4 | 8.2 | A | 0° | A | 0 | −0.1 | A | A |
| 5 | 8.0 | A | 0° | A | 0 | 0 | A | A |
| 6 | 9.2 | A | 0° | A | +0.3 | −0.1 | B–A | A |
| 7 | 18.0 | A | 0° | A | +0.3 | −0.2 | B | B |
| Comparative Example: | | | | | | | | |
| 1 | 8.4 | A | >90° | C | — | — | B | B |
| 2 | 10.2 | C | 10° | B | +1.3 | −1.0 | C | B |
| 3 | 9.2 | B–C | 0° | B | +0.8 | −0.6 | B | B |
| 4 | 10.0 | B | 20° | B | +4.5 | −4.1 | B | C |
| 5 | 8.8 | A | 0° | A | +3.5 | −2.8 | B | C |
| 6 | 9.5 | B–C | 0° | A | +0.3 | −0.2 | B | B |

Note 1:
The results where the separation angle is 0° indicate the state where no adhesion occurred.
Note 2:
The larger values the changes in critical surface tension have, the more the silicone compounds transfer to the magnetic layer.

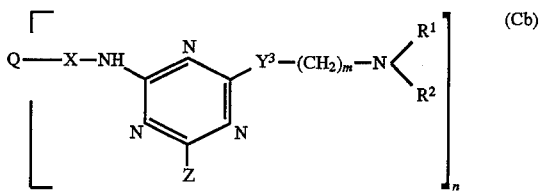

wherein Q is an organic colorant residue selected from the group consisting of phthalocyanine, azo, anthraquinone, quinaquidone, dioxazine, anthrapyrimidine, anthanthron, indanthron, flavanthron, perylene, perynone, thioindigo, isoindolinone, triphenylmethane, and benzimidazolone; X is a direct bond, $CONH-Y^4-$, $-SO_2NH-Y^4$, or $CH_2NHCOCH_2NH-Y^4-$ wherein $Y^4$ is an alkylene or arylene group; $Y^3$ is $-NH$ or $-O-$; Z is hydroxy, alkoxy, or

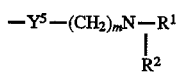

where $Y^5$ is NH or O, or $-NH-X-Q-$ when n is 1; $R^1$ and $R^2$ are each independently substituted or unsubstituted alkyl, or jointly form a substituted or unsubstituted nitrogen heterocycle; m is an integer of 1–6; and n is an integer of 1–4;

binder; and a silicone compound represented by the following formula (I):

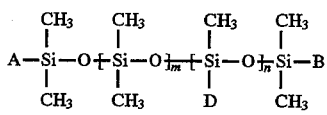

Wherein groups A, B, and D each independently represent $-CH_3$ or a group $-X-Y-Z$, in which X represents a $C_1-C_{11}$ alkylene or $-(CH_2)_3NHCO-$, Y represents an aliphatic group, alicyclic group, or an aromatic group having at least 3 carboxylate ester bonds therein and a number-average molecular weight Mn of from about 300 to about 3,000, and Z represents $-OH$, m is an integer from 4 to about 150, and n is an integer from 1 to 6, the compound of formula (I) containing at least one $-X-Y-Z$ group, with the ratio of the number of groups $-X-Y-Z$ to m being from 1:3 to 1: about 30, said silicon compound in the amount of from 0.05% to 10.0% based on the non-volatile weight of the coating composition.

2. The magnetic recording medium according to claim 1, wherein the carboxylate ester bonds are linked to each other through a hydrocarbon group having 2 to 12 carbon atoms.

3. The magnetic recording medium according to claim 2, wherein the carboxylate ester bonds are linked to each other through a hydrocarbon group having 4 to 6 carbon atoms.

4. The magnetic recording medium according to claim 1, herein Y is polycaprolactone.

5. The magnetic recording medium according to claim 1, wherein each of A and B is X—Y—Z, and D is $CH_3$.

6. The magnetic recording medium according to claim 1, wherein each of A and B is $CH_3$, and D is X—Y—Z.

7. The magnetic recording medium according to claim 1, wherein the number of the X—Y—Z groups to m is from 1:4 to 1:16.

8. The magnetic recording medium according to claim 1, wherein the filler further comprises at least one selected from the group consisting of graphite, calcium carbonate, barium sulfate, titanium oxide, alpha-iron oxide, plate-like alpha-iron oxide, alumina, zirconia, silicon carbide, silicon oxide, chromium oxide, magnesium carbonate, zinc oxide, and silica.

9. The magnetic recording medium according to claim 1, wherein the binder is a thermoplastic resin having a glass transition temperature of from $-100°$ to $150°$ C. and a number-average molecular weight of from 1,000 to 200,000.

10. The magnetic recording medium according to claim 1, wherein the binder is a thermosetting resin selected from phenol resins, epoxy resins, phenoxy resins, polyurethane setting resins, urea resins, melanine resins, alkyd resins, acrylic resins, formaldhyde resins, silicone resins, mixtures of a polyester resin and an isocyanate prepolymer, mixtures of polyester polyol and polyisocyanate, and mixtures of polyurethane and polyisocyanate.

11. The magnetic recording medium according to claim 1, wherein the binder is a fiber resins selected from nitrocellulose, ethylcellulose, cellulose acetate butyrate, and cellulose acetate propionate.

12. The magnetic recording medium according to claim 1, wherein the binder is a combination of a polyurethane resin and a member selected from the group consisting of vinyl chloride resins, vinyl chloride/vinyl acetate resins, vinyl chloride/vinyl acetate/vinyl alcohol resins, vinyl chloride/vinyl acetate/maleic anhydride resins, vinyl chloride/acrylic ester resins, nitrocellulose, and phenoxy resins; or a mixture of any one of the combinations with polyisocyanate.

13. The magnetic recording medium according to claim 1 wherein the binder is selected from a combination of nitrocellulose, a urethane resin and polyisocyante; and a combination of a vinyl chloride resin, a urethane resin and polyisocyanate.

14. The magnetic recording medium according to claim 13, wherein the urethane resin is selected from polyester polyurethane, polyether polyurethane, polycarbonate polyurethane, and polycaprolactone polyurethane, which may optionally have at least one polar group selected from the group consisting of $-COOM$, $-SO_3M$, $-OSO_3M$, $-PO(OM)_2$ (M is hydrogen or alkali metal), $-OH$, $NR_2$, $N^+R_3$ (R is hydrocarbon), epoxy, and sulfobetaine.

15. The magnetic recording medium according to claim 13, wherein polyisocyanate is selected from tolylene diisocyanate, 4,4'-diphenylmethane diisocyanate, hexamethylene diisocyanate, xylylene diisocyanate, orthotoluidine isocyanate, isophorone diisocyanate, and triphenylmethane triisocyanate; reaction products of any one of the isocyanates and a polyalcohol; and polyisocyanates obtained from condensation reaction of isocyanates.

16. The magnetic recording medium according to claim 1, wherein the hydroxyl value of the silicone compound is not less than 5 (KOHmg/g).

17. The magnetic recording medium according to claim 1, wherein said organic colorant is in the amount of from 0.1% to 50% based on the weight of said filler.

18. The magnetic recording medium according to claim 1, wherein the ratio of the filler to the binder is from 100:5 to 100:300.

* * * * *